United States Patent [19]
Yamasaki et al.

[11] Patent Number: 5,151,893
[45] Date of Patent: Sep. 29, 1992

[54] OPTICAL DATA RECORDING AND REPRODUCING APPARATUS

[75] Inventors: Yukihiro Yamasaki, Hirakata; Toshio Suetsugu, Katano; Tamotsu Matsuo, Osaka; Hideo Okamura, Hirakata, all of Japan

[73] Assignee: Matsushita Electric Industrial Co., Ltd., Osaka, Japan

[21] Appl. No.: 530,795

[22] Filed: May 30, 1990

[30] Foreign Application Priority Data

Jun. 5, 1989 [JP] Japan ................ 1-142508
Jun. 5, 1989 [JP] Japan ................ 1-142509
Jun. 5, 1989 [JP] Japan ................ 1-142510
Jun. 5, 1989 [JP] Japan ................ 1-142512

[51] Int. Cl.⁵ .................................. G11B 7/00
[52] U.S. Cl. ................. 369/116; 369/59; 369/121; 369/112
[58] Field of Search ........... 369/116, 122, 112, 121, 369/124, 58, 59, 54, 111

[56] References Cited

U.S. PATENT DOCUMENTS 4,509,156  4/1985  Ohara et al. ............. 369/116
4,701,609  10/1987 Koishi et al. ........... 369/116
4,754,460  6/1988  Kimura et al. .......... 369/116

FOREIGN PATENT DOCUMENTS

61-39243  2/1986  Japan .
61-192042 8/1986  Japan .
62-66431  3/1987  Japan ...................... 369/116
63-90037  4/1988  Japan .

Primary Examiner—Roy N. Envall, Jr.
Assistant Examiner—Nabil Hindi
Attorney, Agent, or Firm—Stevens, Davis, Miller & Mosher

[57] ABSTRACT

In an optical data recording and reproducing apparatus comprising an information signal generator, a sample-/hold switching signal generator, a write/read switching signal generator, a laser beam source, a reference voltage generator, a comparator and a photo detector, a dummy signal is added to the information signal modulating the laser beam or generation of the laser beam is forcedly stopped after a data write servo mode so as to prevent generation of the laser beam of an excessively high level at the time of change-over from the data write servo mode to a data write hold mode or from the data write hold mode to a data read mode, or the level of the write/read switching signal is changed before the level of the sample/hold switching signal is changed at the time of change-over from the data write hold mode to the data read mode, or the duration of emission of the laser beam is extended slightly before the level of the sample/hold switching signal is changed.

5 Claims, 11 Drawing Sheets

OPTICAL DATA RECORDING AND REPRODUCING APPARATUS

BACKGROUND OF THE INVENTION

This invention relates to an optical data recording and reproducing apparatus for optically recording and reproducing data on and from a recording medium such as an optical disk.

Figure 1:
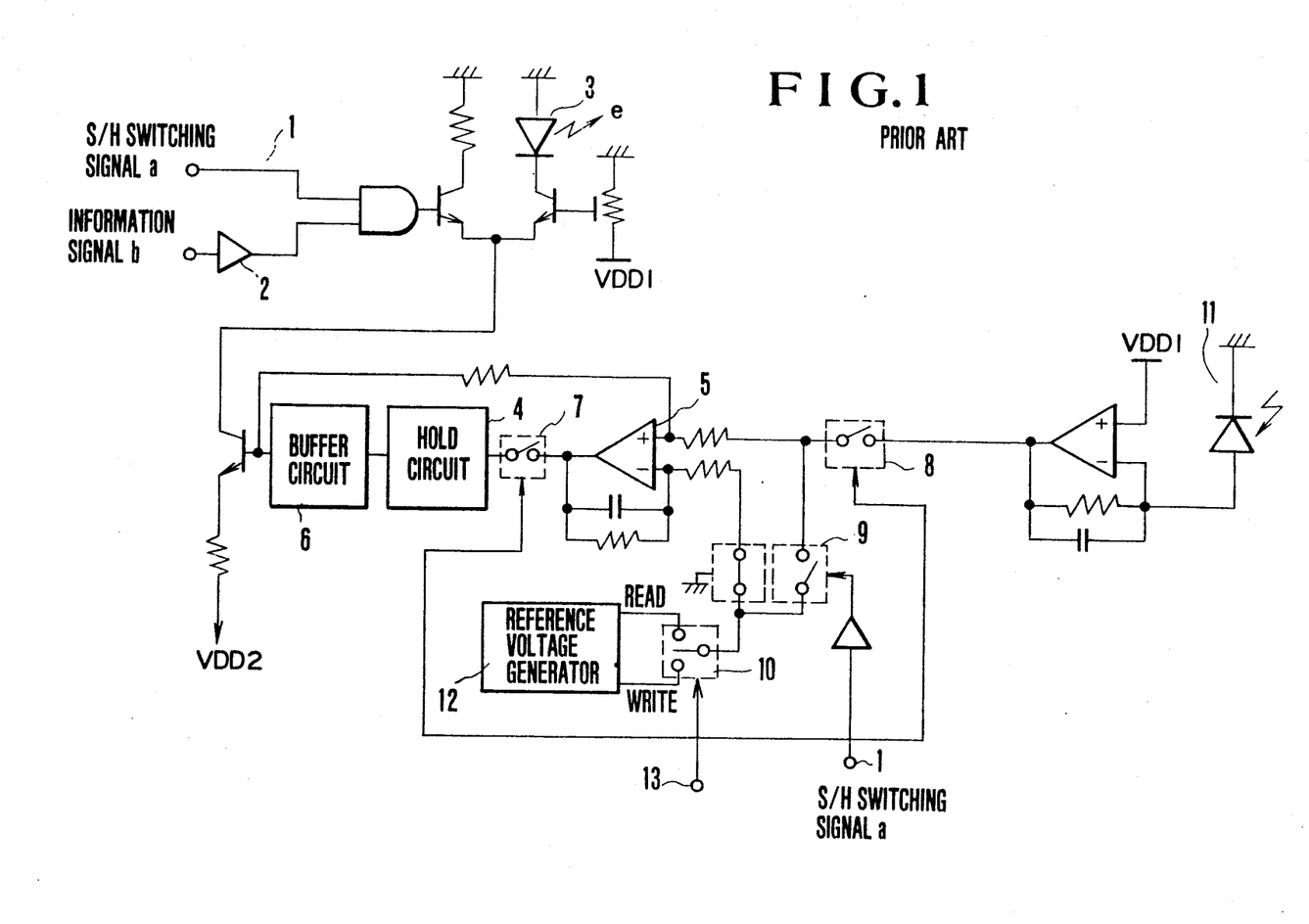
FIG. 1 is a block circuit diagram of a semiconductor laser driver circuit incorporated in an optical data recording and reproducing apparatus.

One form of a prior art optical data recording and reproducing apparatus will be described with reference to FIGS. 1 and 2 before describing the present invention in detail so that the present invention can be clearly understood. FIG. 1 is a block circuit diagram showing the structure of a semiconductor laser driver circuit incorporated in the prior art optical data recording and reproducing apparatus, and FIG. 2 is a timing chart illustrating the operation of the semiconductor laser driver circuit shown in FIG. 1.

Figure 2:
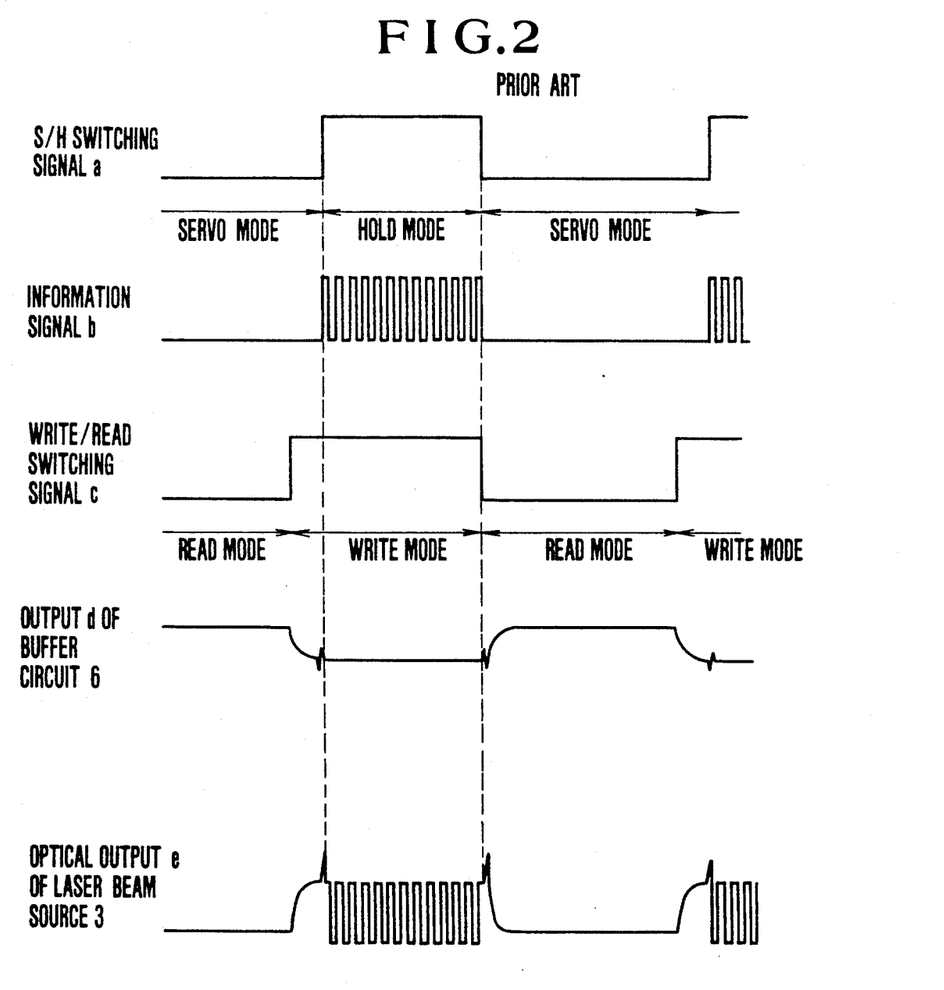
FIG. 2 is a signal waveform diagram for illustrating the operation of the semiconductor laser driver circuit shown in FIG. 1.

Referring to FIG. 1, the semiconductor laser driver circuit incorporated in the prior art optical data recording and reproducing apparatus includes an input terminal 1 for a sample/hold (S/H) switching signal having a waveform as shown in FIG. 2, an input terminal 2 for an information signal b having a waveform as shown in FIG. 2, a semiconductor laser 3 generating an optical output having a waveform as shown in FIG. 2, a hold circuit 4, a comparator 5, a buffer circuit 6 generating an output signal d having a waveform as shown in FIG. 2, analog switches 7 to 10, a photo detector 11 built in a semiconductor laser package, a reference voltage generator circuit 12, and an input terminal 13 for a write-/read switching signal c having a waveform as shown in FIG. 2.

The operation of the semiconductor laser driver circuit in the prior art optical data recording and reproducing apparatus having the structure shown in FIG. 1 will now be described.

In a data read mode, the sample/hold switching signal a is in its low level, and the analog switches 7 and 8 are turned on, while the analog switch 9 is turned off. The analog switch 10 supplies a read reference voltage from the reference voltage generator circuit 12 to one of the input terminals of the comparator 5. At this time, the laser beam source 3 generates its DC optical output. A current proportional to the DC optical output of the laser beam source 3 flows out from the photo detector 11 and is converted into a voltage which is supplied to the other input terminal of the comparator 5. The comparator 5 acts to apply a power servo action to the laser beam source 3, so that the optical output of the laser beam source 3 can be maintained constant.

In a data write mode, a write reference voltage from the reference voltage generator circuit 12 is supplied through the analog switch 10 to the comparator 5, so that the optical output of the laser beam source 3 attains its write power level. Thereafter, the sample/hold switching signal is turned into its high level, and the analog switches 7 and 8 are turned off so as to hold the current corresponding to the write power level of the optical output of the laser beam source 3. Further, the optical output of the laser beam source 3 is modulated by the information signal b. As described above, the power servo action is kept applied until the optical output of the laser beam source 3 attains its write power level, and then the optical output held in that level is modulated by the information signal b.

However, in the case of the prior art structure shown in FIG. 1, the laser beam source 3 generates the optical output of write power level over a long period of time of about 5 to 10 μs in the data write mode, and, depending on the write power level, the optical output of the laser beam source 3 tends to exceed its allowable value (CW). Thus, the prior art structure has had a problem that writing the information with such a DC optical output on a recording medium such as an optical disk leads to undesirable deterioration of the recording medium or undesirable deterioration of the laser beam source 3.

Further, the prior art structure has had another problem that, due to the source-drain discharge of the analog switches 7 to 9 at the time of switching from the data write servo mode to the data write hold mode and also due to the gate-source capacity and gate-drain capacity of the analog switches, the level changing edge of the gate signal is superposed on the source-drain voltage of the analog switches 7 to 9, and the current supplied to the laser beam source 3 increases to cause generation of an excessively high optical output from the laser beam source 3, with the result that the laser beam source 3 will be deteriorated or unnecessary pits will be written on the recording medium.

SUMMARY OF THE INVENTION

With a view to solve the problems described above, it is an object of the present invention to provide an optical data recording and reproducing apparatus comprising means for preventing deterioration of a laser beam source as well as deterioration of a recording medium in a data write mode.

According to the first aspect of the optical data recording and reproducing apparatus of the present invention which solves the above-noted problems, a dummy signal having a predetermined frequency is added for a predetermined period of time to an information signal which modulates a laser beam emitted from a laser beam source in the data write mode in which data is recorded on a recording medium such as an optical disk with the laser beam.

Thus, by adding a dummy signal having a predetermined frequency to the laser-modulating information signal for a predetermined period of time in the data write mode, the power level of the optical output of the laser beam source can be limited to lower than the allowable value (CW), so that undesirable deterioration of the laser beam source, as well as undesirable deterioration of the recording medium, can be reliably prevented.

Also, it is another object of the present invention to provide an optical data recording and reproducing apparatus comprising means for preventing generation of an excessively high optical output from a laser beam source at the time of change-over from a data write servo mode to a data write hold mode or from the data write hold mode to a data read mode.

According to the second aspect of the optical data recording and reproducing apparatus of the present invention in which the laser beam emitted from the laser beam source is used to write and read data on and from an optical disk, emission of the laser beam from the laser beam source is forcedly stopped for a predetermined period of time after the end of the data write servo mode or after the end of the data write hold mode, so that an excessively high optical output may not be generated from the laser beam source at the time of change-over from the data write servo mode to the data write hold mode or from the data write hold mode to the data read mode.

Because of the above arrangement of the second aspect of the present invention, the laser beam source can be deenergized for a predetermined period of time at the time of change-over from the data write servo mode to the data write hold mode or from the data write hold mode to the data read mode, thereby preventing generation of an excessively high optical output from the laser beam source, so that undesirable deterioration of the laser beam source or recording unnecessary pits on a recording medium can be prevented.

Further, with a view to solve the above-noted problems, it is still another object of the present invention to provide an optical data recording and reproducing apparatus comprising means for preventing generation of an excessively high optical output from a semiconductor laser at time $T_3$ of change-over from a data write hold mode to a data read mode.

The optical data recording and reproducing apparatus embodying the third aspect of the present invention comprises control means so that, at the time of change-over from the data write hold mode to the data read mode, a write/read switching signal is changed over earlier than a sample/hold switching signal or the duration of laser beam emission from the semiconductor laser is extended slightly earlier than the time of level change of the sample/hold switching signal.

Because of the above arrangement of the third aspect of the present invention, the output level of a comparator can be reduced at the time of change-over from the data write hold mode to the data read mode, so that generation of an excessively high optical output from the semiconductor laser can be prevented.

DESCRIPTION OF THE PREFERRED EMBODIMENT

Preferred embodiments of the optical data recording and reproducing apparatus according to the present invention will now be described in detail with reference to the drawings.

Figure 3:
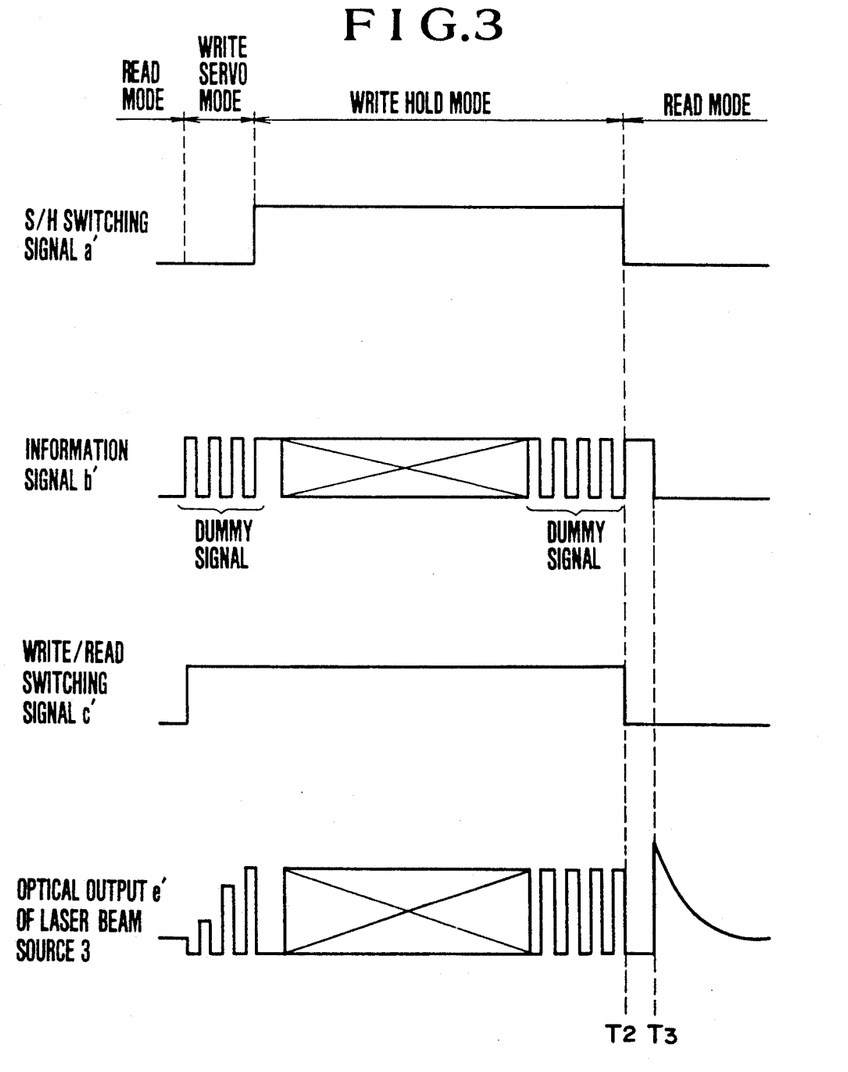
FIG. 3 is a signal waveform diagram in accordance with the instant invention illustrating the operation of a semiconductor laser driver circuit configured as in FIG. 1.

In accordance with one embodiment of the present invention, a sample/hold switching signal a', an information signal b' and a write/read switching signal c' having waveforms as shown in FIG. 3 may be applied in lieu of the respective signals a, b and c having the waveforms shown in prior art FIG. 2. In this case, the sample/hold switching signal a' is in its low level in the data read mode, and the analog switches 7 and 8 are turned on, while the analog switch 9 is turned off. The read reference voltage from the reference voltage generator circuit 12 is supplied through the analog switch 10 to one of the input terminals of the comparator 5. At this time, the semiconductor laser 3 generates its DC optical output e' as shown in FIG. 3. A current proportional to this DC optical output e' flows out from the photo detector 11 and is converted into a voltage which is supplied to the other input terminal of the comparator 5. The comparator 5 acts to apply a power servo action to the laser beam source 3 so that the optical output of the laser beam source 3 can be maintained constant.

In the data write servo mode, the write reference voltage from the reference voltage generator circuit 12 is supplied through the analog switch 10 to the comparator 5. At this time, a dummy signal added to the information signal b' is applied to the signal input terminal 2. The optical output e' of the semiconductor laser 3 is modulated by this dummy signal, and the comparator 5 acts to apply a power servo action in a manner similar to that described above. Then, in the data write hold mode, the sample/hold switching signal a' is turned into its high level, and the analog switches 7 and 8 are turned off. Because now data in the information signal b' is applied to the signal input terminal 2, the optical output e' of the semiconductor laser 3 is modulated by the data signal, and its amplitude is held from the data write servo mode.

However, such structure has had a problem that, as shown in FIG. 3, the semiconductor laser 3 generates an excessively high optical output e' at time $T_3$ where the data write hold mode is changed over to the data read mode.

This problem arises due to the fact that, at the time of change-over from the data write hold mode to the data read mode, application of the dummy signal is stopped during a predetermined period of from time $T_2$ to $T_3$ so as to prevent generation of an excessively high optical output from the semiconductor laser 3 due to the switching of the analog switches.

Figure 4:
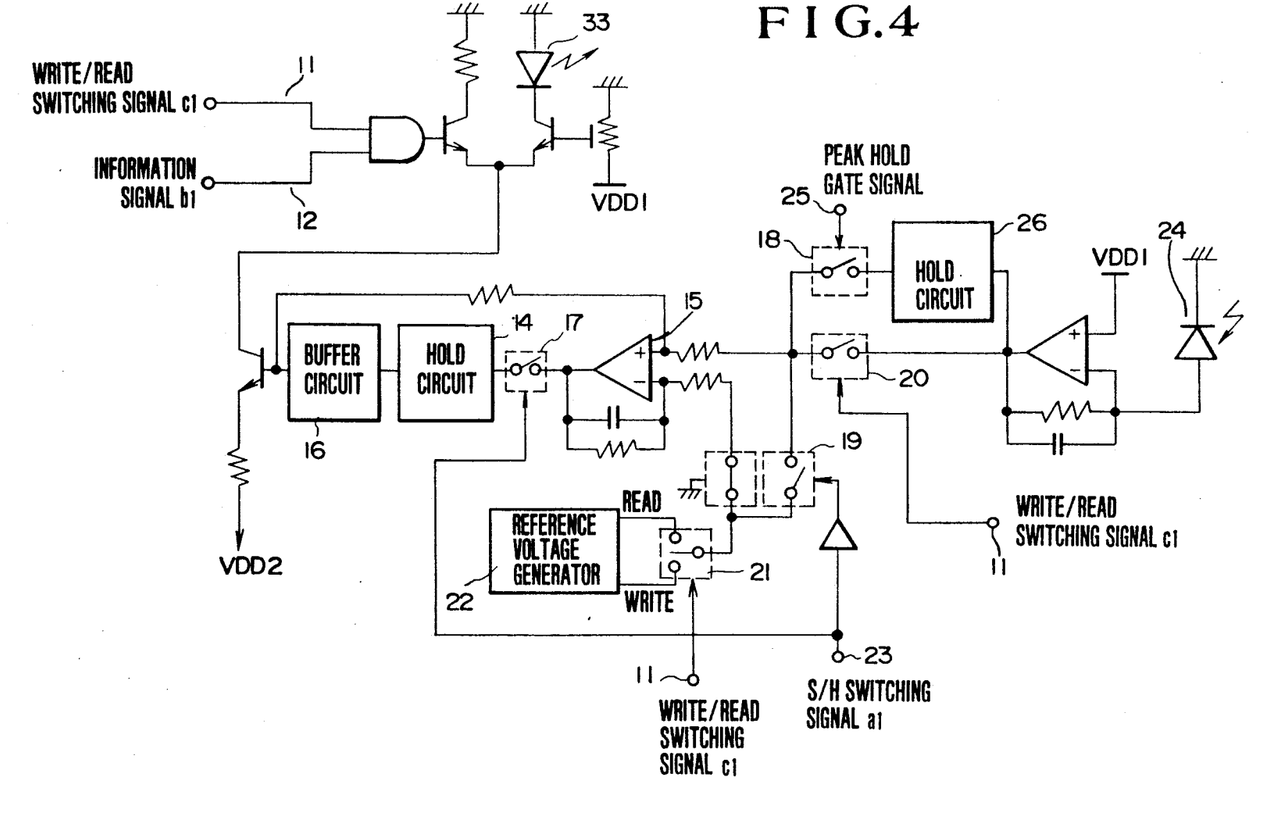
FIG. 4 is a block circuit diagram of one form of semiconductor laser driver circuit incorporated in a one embodiment of the optical data recording and reproducing a according to the present invention.

FIG. 4 is a block circuit diagram showing the structure of one form of a semiconductor laser driver circuit incorporated in an embodiment of the optical data recording and reproducing apparatus according to the present invention.

Referring to FIG. 4, the semiconductor laser driver circuit includes an input terminal 11 for a write/read switching signal $c_1$, an input terminal 12 for an information signal $b_1$, a laser beam source 33, a hold circuit 14, a comparator 15, a buffer circuit 16, analog switches 17 to 21, a reference voltage generator circuit 22, an input terminal 23 for a sample/hold switching signal $a_1$, a photodetector 24, an input terminal 25 for a peak hold gate signal $d_1$, and a peak hold circuit 26.

The operation of the optical data recording and reproducing apparatus including the semiconductor laser driver circuit having the structure shown in FIG. 4 will now be described with reference to FIGS. 4 and 5.

Figure 5:
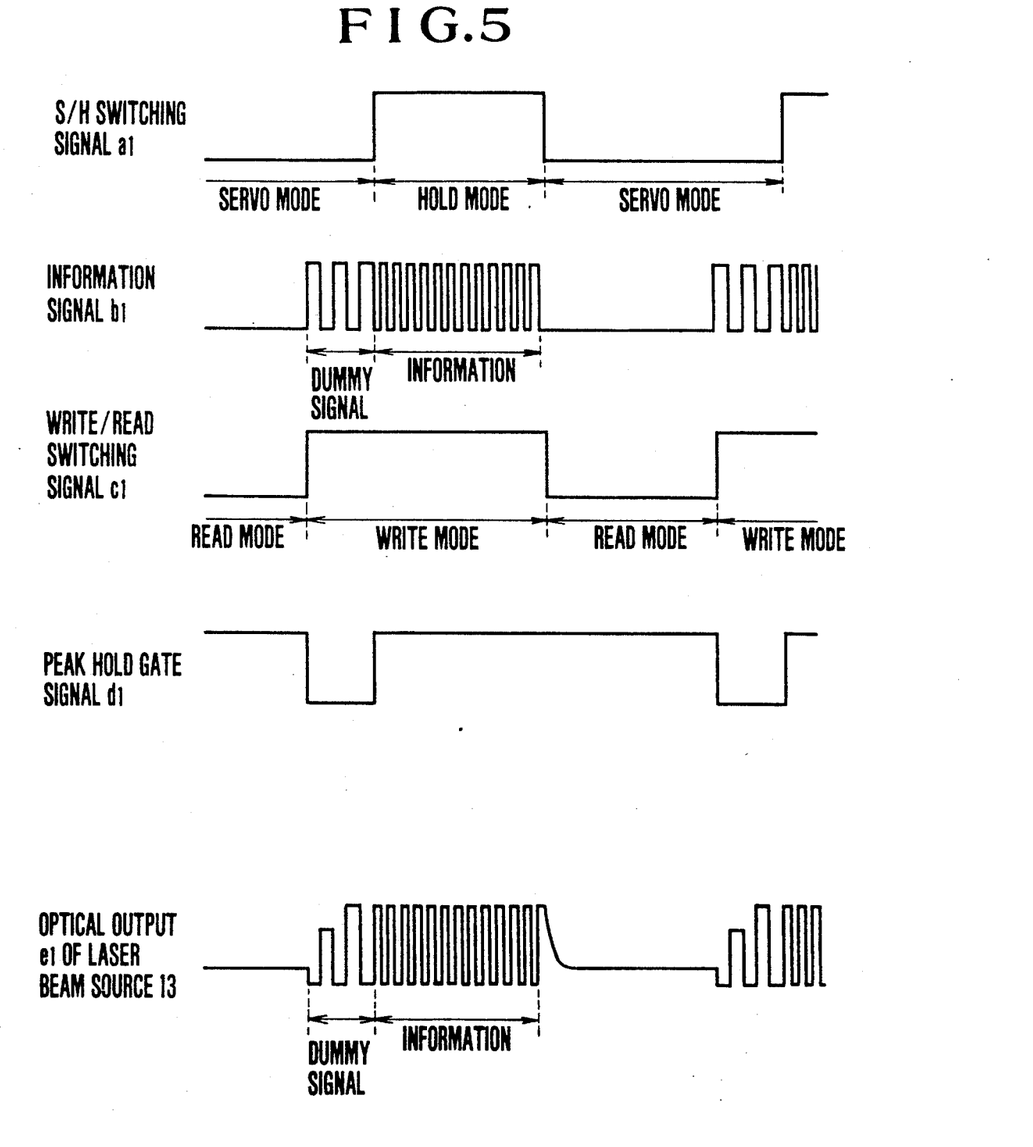
FIG. 5 is a signal waveform diagram for illustrating the operation of the semiconductor laser driver circuit shown in FIG. 4.

FIG. 5 is a timing chart of the operation of the FIG. 4 embodiment and shows also an optical output $e_1$ of the laser beam source 33. In a data read mode, the write/read switching signal $c_1$ is in its low level, and a read reference voltage from the reference voltage generator circuit 22 is supplied through the analog switch 21 to one of the input terminals of the comparator 15. The sample/hold switching signal $a_1$ is also in its low level, and the analog switches 17 and 20 are turned on, while the analog switch 19 is turned off. The peak hold gate signal $d_1$ is in its high level, and the analog switch 18 is turned off. At this time, the laser beam source 33 generates its DC optical output $e_1$. A current proportional to the DC optical output of the laser beam source 33 flows out from the photo detector 24 and is converted into a voltage which is supplied to the other input terminal of the comparator 15. The comparator 15 acts to apply a power servo action to the laser beam source 33, so that the optical output $e_1$ of the laser beam source 33 can be maintained constant.

In a data write mode, the write/read switching signal $c_1$ is turned into its high level, and a write reference voltage from the reference voltage generator circuit 22 is supplied through the analog switch 21 to the comparator 15. The laser beam emitted from the laser beam source 33 is modulated by a dummy signal added to the information signal $b_1$. The peak hold gate signal $d_1$ is turned into its low level, and the analog switch 18 is turned on, while the analog switch 20 is turned off. A current proportional to the optical output pulses of the laser beam source 33 flows out from the photo detector 24, and the peak hold circuit 26 makes peak hold detection of the optical output $e_1$ of the laser beam source 33 modulated by the dummy signal. On the basis of the result of the peak hold detection by the peak hold circuit 26, the comparator 15 acts to apply a power servo action to the laser beam source 33, so that the optical output $e_1$ of the laser beam source 33 can be maintained constant.

After the optical output $e_1$ of the laser beak source 33 modulated by the dummy signal attains the desired write power level, the sample/hold switching signal $a_1$ is turned into its high level, and the peak hold gate signal $d_1$ is also turned into its high level, thereby turning off the analog switches 17, 18 and turning on the analog switch 19. The analog switch 19 acts to prevent saturation of the comparator 15 in the data write hold mode. The hold circuit 14 holds the voltage of the write current source so as to maintain the write power level of the laser beam emitted from the laser beam source 33.

Thus, according to the illustrated embodiment of the present invention, a dummy signal is added to the laser-modulating information signal for a predetermined period of time in the data write servo mode, so that the power level of the optical output of the laser beam source 33 can be limited to lower than the allowable value (CW), thereby preventing undesirable deterioration of the laser beam source 33 as well as undesirable deterioration of a recording medium.

In the illustrated embodiment, the photo detector 24 is disposed outside of a laser package. However, this photo detector 24 may be built in the laser package.

Also, the peak hold circuit 26 used in the illustrated embodiment may be replaced by a mean value circuit.

Further, the frequency and pulse width of the dummy signal are not limited to any specific values.

It will be understood from the above description of the first embodiment that a dummy signal having a predetermined frequency is added to a laser-modulating information signal for a predetermined period of time in the starting stage of the data write mode, so that the present invention can provide an excellent optical data recording and reproducing apparatus which can prevent undesirable deterioration of its laser beam source as well as undesirable deterioration of a recording medium.

Another embodiment of the optical data recording and reproducing apparatus according to the present invention will now be described with reference to the drawings.

Figure 6:
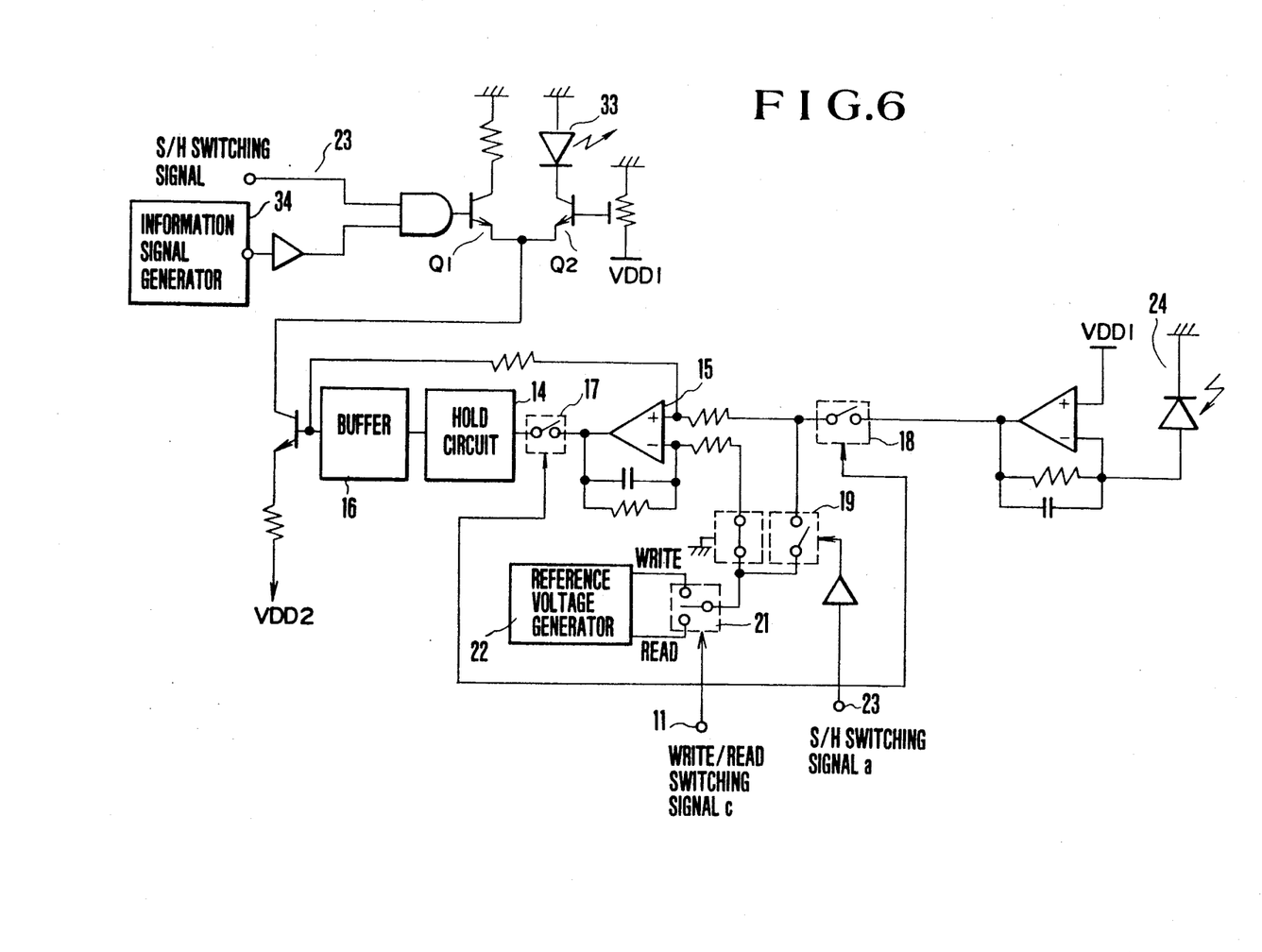
FIG. 6 is a block circuit diagram of another form of the semiconductor laser driver circuit incorporated in another embodiment of the present invention.

FIG. 6 is a block circuit diagram showing the structure of another form of the semiconductor laser driver circuit incorporated in another embodiment of the optical data recording and reproducing apparatus of the present invention. In FIG. 6, the same reference numerals are used to designate the same parts appearing in FIG. 4.

The embodiment including the laser driver circuit shown in FIG. 6 is featured by the provision of an information signal generator circuit 34 generating an information signal b''.

The operation of the optical data recording and reproducing apparatus including the laser driver circuit having the structure shown in FIG. 6 will now be described with reference to FIGS. 6 and 7.

Figure 7:
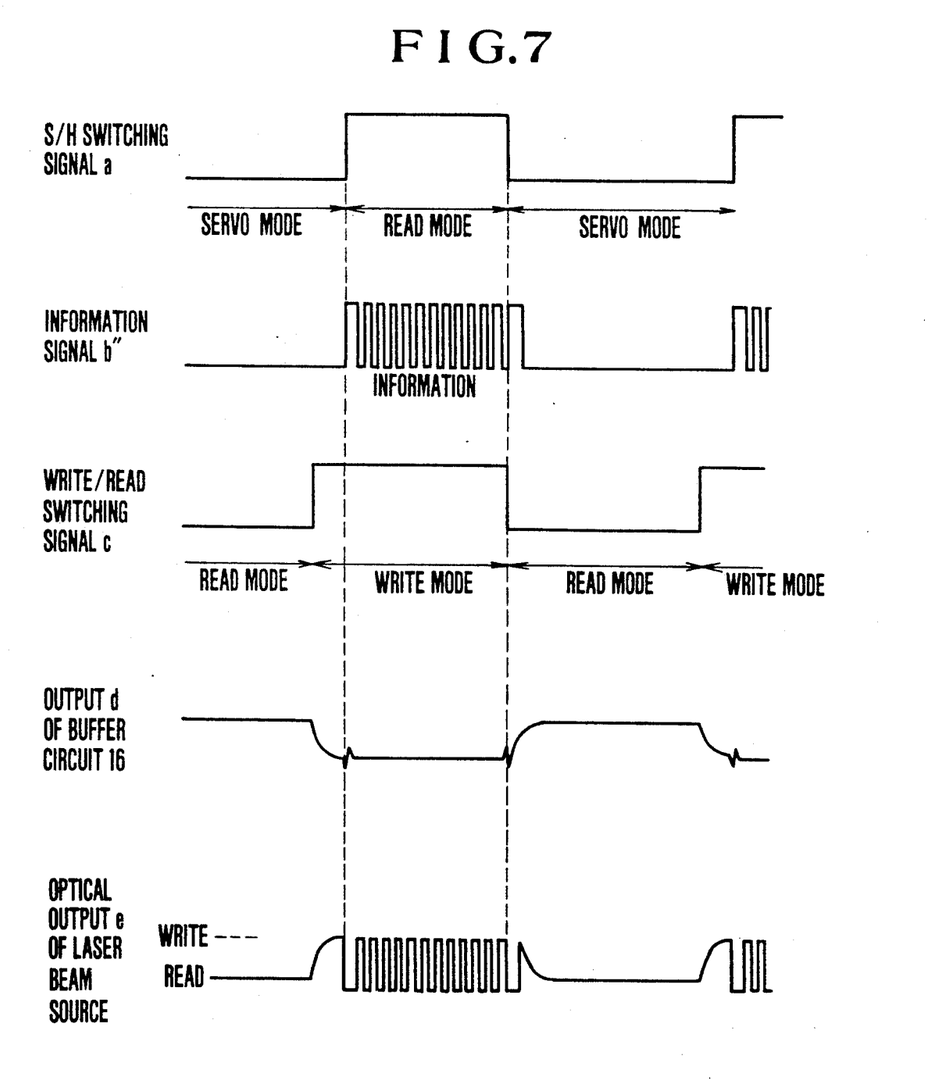
FIG. 7 is a signal waveform diagram for illustrating the operation of the semiconductor laser driver circuit shown in FIG. 6.

FIG. 7 is a timing chart of the operation of the illustrated embodiment and shows also an optical output e of the laser beam source 33. In a data read mode, a write/read switching signal c is in its low level, and a read reference voltage from the reference voltage generator circuit 22 is supplied through the analog switch 21 to one of the input terminals of the comparator 15. A sample/hold switching signal is also in its low level, and the analog switches 17 and 18 are turned on, while the analog switch 19 is turned off. At this time, the laser beam source 33 generates its DC optical output e. A current proportional to the DC optical output of the laser beam source 33 flows out from the photo detector 24 and is converted into a voltage which is supplied to the other input terminal of the comparator 15. The comparator 15 acts to apply a power servo action to the laser beam source 33, so that the optical output e of the laser beam source 33 can be maintained constant.

In a data write mode, the write/read switching signal is turned into its high level, and a write reference voltage from the reference voltage generator circuit 22 is supplied through the analog switch 21 to the comparator 15, so that the optical output e of the laser beam source 33 attains its write power level. Thereafter, the sample/hold switching signal a is turned into its high level, thereby turning off the analog switches 17, 18 and turning on the analog switch 19. The analog switch 19 acts to prevent saturation of the comparator 15 in the data write hold mode. The hold circuit 14 holds the voltage of the write current source so as to maintain the optical output e of the laser beam source 33. As soon as the sample/hold switching signal a is turned into its high level, the information signal b" is turned into its high level, thereby turning on a transistor $Q_1$ and turning off another transistor $Q_2$ in a switching circuit so as to forcedly stop generation of the optical output e from the laser beam source 33.

At the time of change-over from the data write hold mode to a data read mode, the write/read switching signal c is turned into its low level so as to supply the read reference voltage to the comparator 15. The sample/hold switching signal a is turned into its low level to cause change-over from the hold mode to the servo mode. At this time too, the information signal b" is turned into its high level as soon as the sample/hold switching signal a is turned into its low level, and the information signal b" is maintained in the high level for a predetermined period of time so as to forcedly stop generation of the optical output e from the laser beam source 33.

Thus, according to the FIG. 6 embodiment, generation of the optical output from the laser beam source 33 is forcedly stopped for a predetermined period of time at the time of change-over from the data write servo mode to the data write hold mode or from the data write hold mode to the data read mode. Therefore, an underable abrupt increase or decrease in the voltage of the write current source attributable to the source-drain discharge of the analog switches 17 to 19 or attributable to superposition of the level changing edge of the gate signal on the source-drain voltage of the analog switches 17 to 19 due to their gate-source capacity and gate-drain. capacity can be prevented, thereby preventing generation of an excessively high optical output from the laser beam source 33.

The write/read switching signal c applied to the second embodiment may be replaced by a read/erase/-write signal. Also, the photodetector 24 may be built in the semiconductor laser package.

It will be understood from the above description of the FIG. 6 embodiment that generation of the optical output from the laser beam source 33 is forcedly stopped for a predetermined period of time at the time of change-over from the data write servo mode to the data write hold mode or from the data write hold mode to the data read mode. Therefore, the present invention can provide an excellent optical data recording and reproducing apparatus in which generation of an excessively high optical output from the laser beam source 33 can be prevented thereby preventing an adverse effect on an optical disk as well as undesirable deterioration of the laser beam source.

Another embodiment of the optical data recording and reproducing apparatus according to the present invention will now be described with reference to the drawings.

Figure 8:
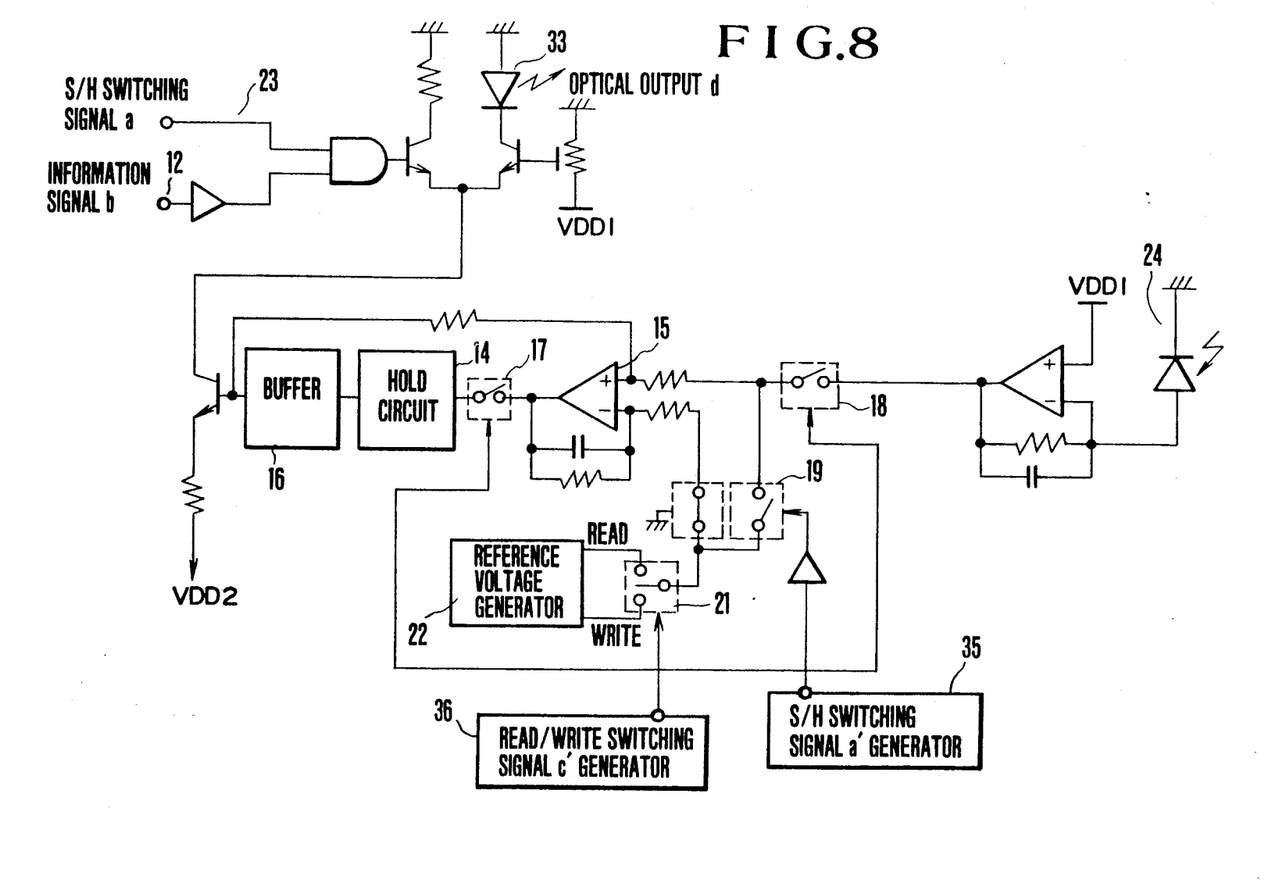
FIG. 8 is a block circuit diagram of still another form of the semiconductor laser driver circuit incorporated in yet another embodiment of the present invention.
Figure 9:
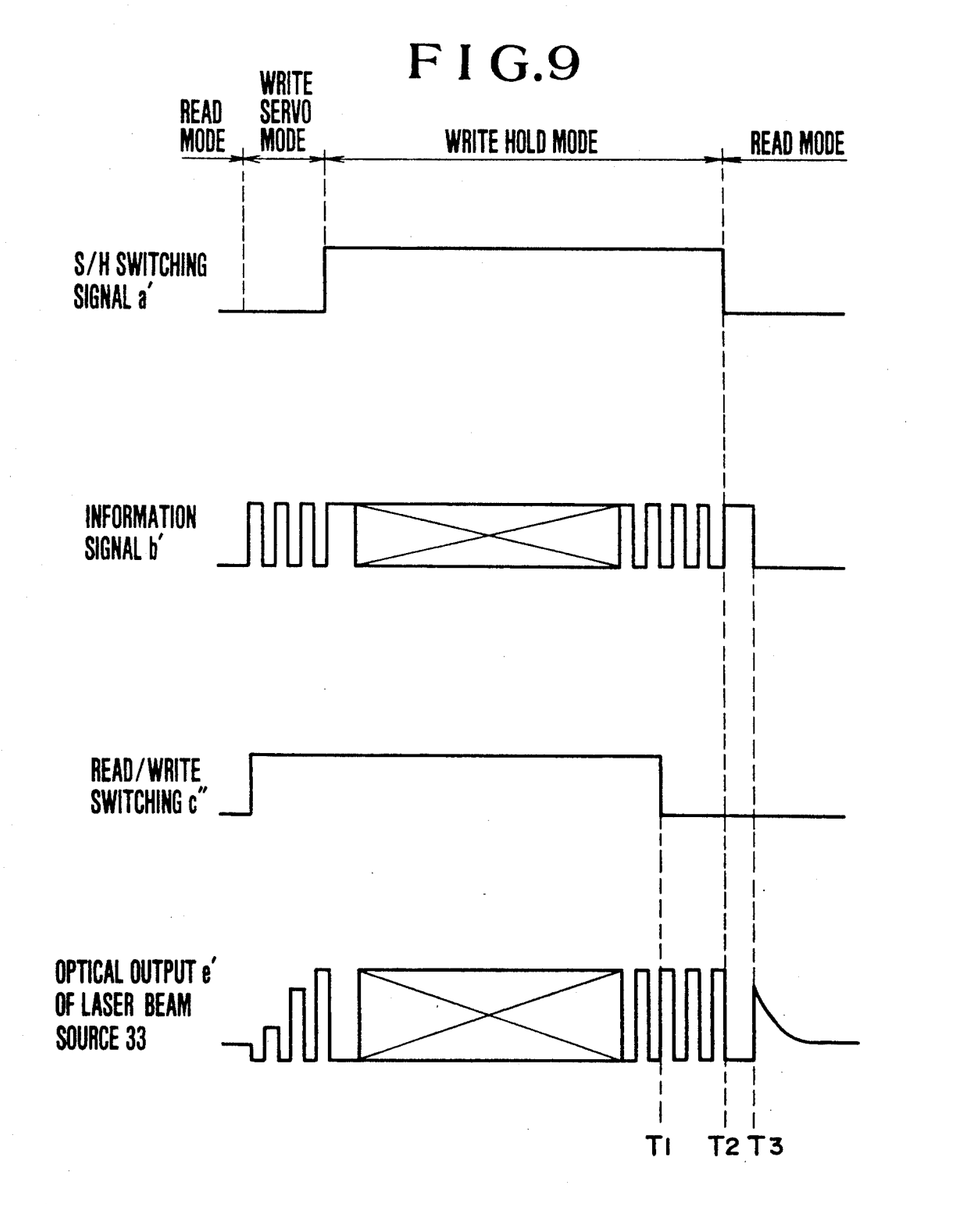
FIG. 9 is a signal waveform diagram for illustrating the operation of the semiconductor laser driver circuit shown in FIG. 8.

FIG. 8 is a block circuit diagram showing the structure of still another form of the semiconductor laser driver circuit incorporated in an embodiment of the optical data recording and reproducing apparatus of the present invention, and FIG. 9 is a timing chart of the operation of the semiconductor laser driver circuit shown in FIG. 8. In FIG. 8, the same reference numerals are used to designate the same parts appearing in FIG. 4.

Referring to FIG. 8, the semiconductor laser driver circuit includes a sample/hold switching signal generator circuit 35 generating a sample/hold switching signal a', and a write/read switching signal generator circuit 36 generating a write/read switching signal c". An information signal b' and a laser optical output e' shown in FIG. 9 are similar to those shown in FIG. 3 respectively.

The operation of the optical data recording and reproducing apparatus including the semiconductor laser driver circuit having the structure shown in FIG. 8 will now be described with reference to FIGS. 8 and 9.

The embodiment including the semiconductor laser driver circuit shown in FIG. 8 is featured in that the write/read switching signal c" is turned into its low level at time $T_1$ slightly earlier than time $T_2$ at which the operation mode is changed over from a data write hold mode to a data read mode. That is, at time $T_1$, a read reference voltage from the reference voltage generator circuit 22 is supplied through the analog switch 21 to the minus input terminal of the comparator 15. This means that the input level at the minus input terminal of the comparator 15 is raised toward the plus side, so that the output level of the comparator 15 is lowered between the time $T_1$ and the time $T_2$, thereby preventing generation of an excessively high optical output from the semiconductor laser 33 at time $T_3$.

In the manner described above, generation of an excessively high optical output at the time $T_3$ from the semiconductor laser 33 can be prevented when the operation mode is changed over from the data write hold mode to the data read mode at the time $T_2$.

It will be understood from the above description of the FIG. 8 embodiment that the output level of the comparator 15 is lowered at the time of change-over from the data write hold mode to the data read mode, so that generation of an excessively high optical output from the semiconductor laser 33 can be prevented.

Another embodiment of the optical data recording and reproducing apparatus according to the present invention will now be described with reference to the drawings.

Figure 10:
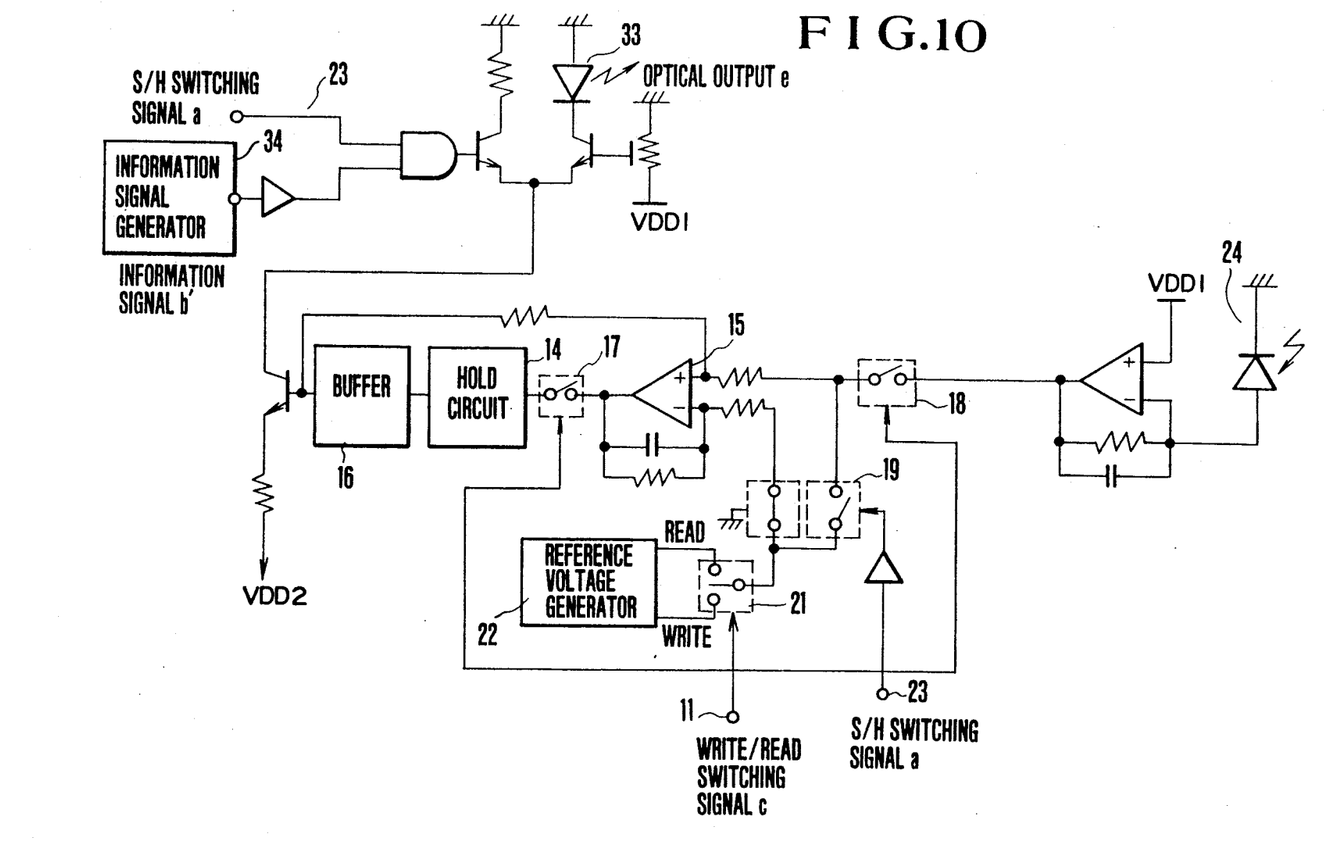
FIG. 10 is a block circuit diagram of yet another form of the semiconductor laser driver circuit incorporated in still another embodiment of the present invention.
Figure 11:
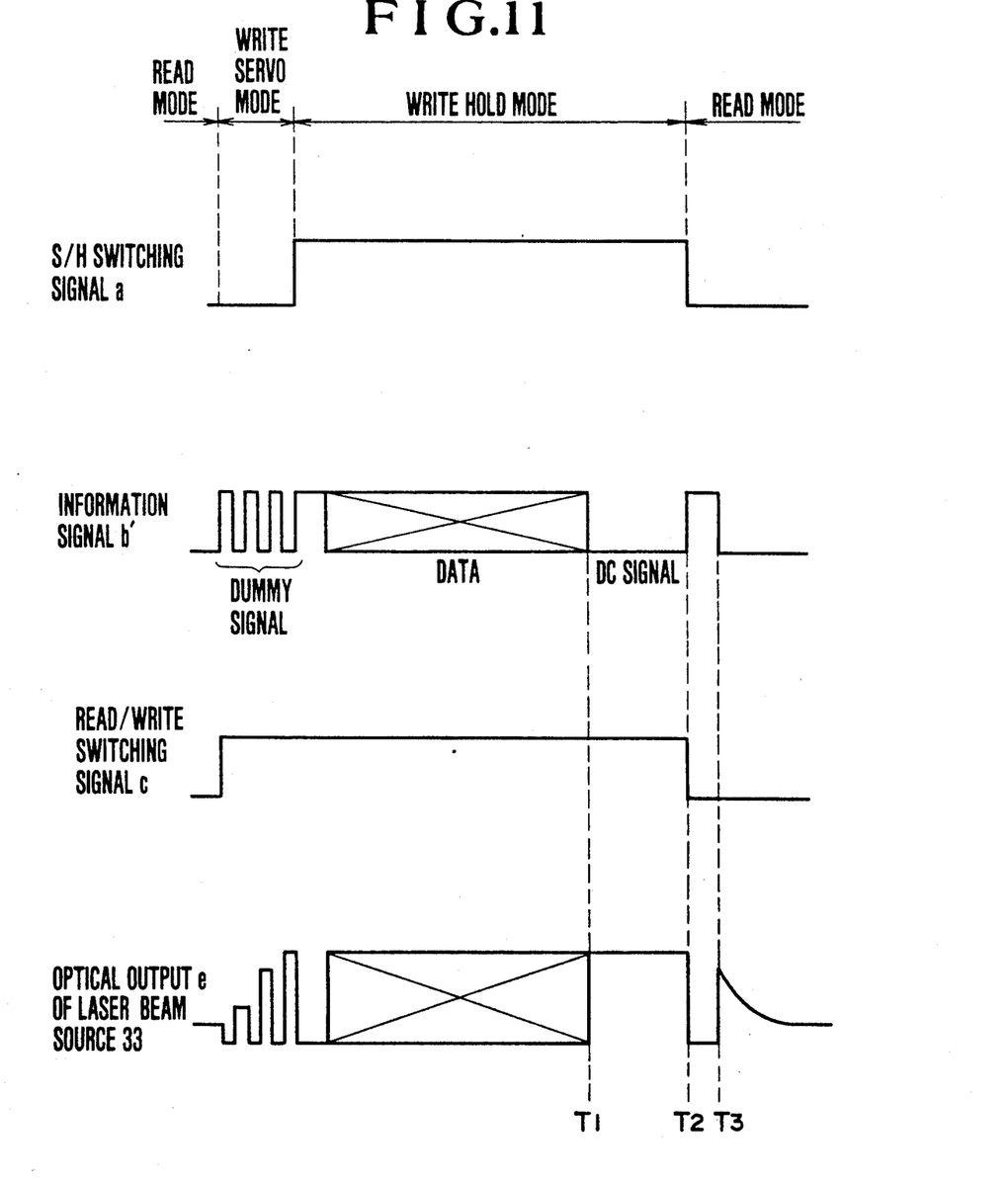
FIG. 11 is a signal waveform diagram for illustrating the operation of the semiconductor laser driver circuit shown in FIG. 10.

FIG. 10 is a block circuit diagram showing the structure of yet another form of the semiconductor laser driver circuit incorporated in an embodiment of the optical data recording and reproducing apparatus of the present invention, and FIG. 11 is a timing chart of the operation of the semiconductor laser driver circuit shown in FIG. 10. In FIG. 10, the same reference numerals are used to designate the same parts appearing in FIG. 6.

Referring to FIG. 10, the information signal generator circuit 34 generates an information signal b' having a waveform as shown in FIG. 11. A sample/hold switching signal a, a write/read switching signal and a laser optical output e shown in FIG. 11 are similar to those shown in FIG. 3 respectively.

The operation of the optical data recording and reproducing apparatus including the semiconductor laser driver circuit having the structure shown in FIG. 10 will now be described with reference to FIGS. 10 and 11.

This embodiment is featured in that, in lieu of a dummy signal, a signal such as a DC signal is generated at time $T_1$ slightly earlier than time $T_2$ at which the operation mode is changed over from a data write hold mode to a data read mode and that this DC signal is kept generated from the time $T_1$ to the time $T_2$. Thus, the semiconductor laser 33 generates its optical output e for a longer period of time. Thus, when the current output of the photo detector 24 receiving the optical output from the semiconductor laser 33 is converted into a voltage, a low voltage input is applied to the plus input terminal of the comparator 15, and the output of the comparator 15 is lowered between the time $T_1$ and the time $T_2$, so that generation of an excessively high optical output at time $T_3$ from the semiconductor laser 33 can be prevented.

It will be understood from the above description of the FIG. 10 embodiment that generation of an excessively high optical output at the time $T_3$ from the semiconductor laser 33 is prevented when the operation mode is changed over from the data write hold mode to the data read mode at the time $T_2$. In the FIG. 10 embodiment, a DC signal is used in place of the dummy signal added to the information signal b'. However, the duty factor of the dummy signal may be changed so that the semiconductor laser 33 generates its optical output for a longer period of time.

Thus, according to the FIG. 10 embodiment of the present invention, the output of the comparator 15 can be lowered at the time of change-over from the data write hold mode to the data read mode, thereby preventing generation of an excessively high optical output from the semiconductor laser 33.

We claim:

1. An optical data recording and reproducing apparatus comprising:

means using a laser beam source for recording and reproducing data on and from an optical recording medium;

means for applying an information signal modulating said laser beam source, said information signal having added thereto a dummy signal having a predetermined frequency and lasting for a predetermined period of time to terminate immediately before a data write mode is started; and means responding to said dummy signal for actuating a power servo circuit for said laser beam source.

2. An optical data recording and reproducing apparatus comprising:

means using a laser beam source for recording and reproducing data on and from an optical recording medium;

means for applying an information signal modulating said laser beam source;

means responsive to a voltage level of said information signal for forcedly stopping generation of the optical output from said laser beam source for a predetermined period of time after the end of a data write servo mode so as to prevent generation of an excessively high optical output from said laser beam source at the time of change-over from the data write servo mode to a data write hold mode; and means responsive to a voltage level of said information signal for forcedly stopping generation of the optical output from said laser beam source for a predetermined period of time after the end of the data write hold mode so as to prevent generation of an excessively high optical output from said laser beam source at the time of change-over from the data write hold mode to a data read mode.

3. An optical data recording and reproducing apparatus comprising:

means using a laser beam source for recording and reproducing data on and from an optical recording medium;

means for generating a sample/hold switching signal for changing over between a data write servo mode in which the optical output of said laser beam source is maintained constant and a data write hold mode in which the optical output of said laser beam source in said data write servo mode is maintained constant;

means for generating a write/read switching signal ;and means for controlling (a) said means for generating said sample/hold switching signal and (b) said means for generating said write/read switching signal so that the voltage level of said write/read switching signal is changed before the level of said sample/hold switching signal is changed at the time of change-over from said data write hold mode to a data read mode.

4. An optical data recording and reproducing apparatus comprising:

means using a laser beam source for recording and reproducing data on and from an optical recording medium;

means for applying a sample/hold switching signal for changing over between a data write servo mode in which the optical output of said laser beam source is maintained constant and a data write hold mode in which the optical output of said laser beam source in said data write servo mode is maintained constant;

means for applying a write/read switching signal; and means for generating an information signal having a control signal added thereto for extending the period of time of generation of the optical output from said laser beam source before the voltage level of said sample/hold switching signal is changed at the time of change-over from said data write hold mode to a data read mode.

5. An optical data recording and reproducing apparatus as in claim 1, wherein said predetermined frequency of said dummy signal is different from a frequency of said information signal.

* * * * *